United States Patent
Yoshida

(10) Patent No.: US 12,337,489 B2
(45) Date of Patent: Jun. 24, 2025

(54) ARC WELDING ROBOT SYSTEM

(71) Applicant: Fanuc Corporation, Yamanashi (JP)

(72) Inventor: Shigeo Yoshida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 265 days.

(21) Appl. No.: 18/030,593

(22) PCT Filed: Oct. 8, 2021

(86) PCT No.: PCT/JP2021/037452
§ 371 (c)(1),
(2) Date: Apr. 6, 2023

(87) PCT Pub. No.: WO2022/080279
PCT Pub. Date: Apr. 21, 2022

(65) Prior Publication Data
US 2023/0373094 A1    Nov. 23, 2023

(30) Foreign Application Priority Data
Oct. 13, 2020   (JP) ................. 2020-172450

(51) Int. Cl.
*B25J 9/16*      (2006.01)
*B23K 9/095*     (2006.01)
(Continued)

(52) U.S. Cl.
CPC .......... *B25J 9/1694* (2013.01); *B23K 9/0953* (2013.01); *B23K 37/0229* (2013.01); *B25J 15/0019* (2013.01)

(58) Field of Classification Search
CPC .......... G05B 2219/45104; B23K 9/067; B23K 9/0953; B23K 37/0229; B23K 9/0956;
(Continued)

(56) References Cited

FOREIGN PATENT DOCUMENTS

| JP | 10244483 A | 9/1998 |
|---|---|---|
| JP | 2005246425 A | 9/2005 |

(Continued)

OTHER PUBLICATIONS

International Search Report and Written Opinion for International Application No. PCT/JP2021/037452, dated Dec. 14, 2021, 6 pages.

*Primary Examiner* — Ian Jen
*Assistant Examiner* — Renee LaRose
(74) *Attorney, Agent, or Firm* — Buchanan Ingersoll & Rooney PC

(57) ABSTRACT

An arc welding robot system includes: a robot on which a welding torch is mounted; a robot control device; and a welding power supply that supplies power to the welding torch. The robot control device includes: a welding command unit that outputs a command to the welding power supply; a measuring unit that measures, a plurality of times for each welding location, an amount of time from when the welding command unit sends a welding start-up command to the welding power supply in accordance with a welding start command of an arc welding program until a notification signal indicating generation of an arc is returned from the welding power supply; a storage unit that stores a plurality of measured measurement values for each welding location; and a preceding time determination unit that determines, for each welding location, a preceding time for outputting the welding start-up command in advance of a timing at which the welding torch arrives at a welding start point corresponding to the welding start-up command, the determination being made on the basis of the values of the plurality of times of measurements for each welding location stored in the storage unit.

2 Claims, 5 Drawing Sheets

(51) Int. Cl.
  *B23K 37/02* (2006.01)
  *B25J 15/00* (2006.01)
(58) Field of Classification Search
  CPC ..... B23K 9/173; B25J 9/1694; B25J 15/0019;
  B25J 9/1679
  See application file for complete search history.

(56) References Cited

FOREIGN PATENT DOCUMENTS

| | | | |
|---|---|---|---|
| JP | 2012245558 | A | 12/2012 |
| JP | 2014188544 | A | 10/2014 |

ARC WELDING ROBOT SYSTEM

CROSS REFERENCE TO RELATED APPLICATIONS

This is a U.S. National Phase application of PCT/JP2021/037452, filed Oct. 8, 2021, which claims priority to Japanese Patent Application No. 2020-172450, filed Oct. 13, 2020, the disclosures of each of these applications being incorporated herein by reference in their entireties for all purposes.

FIELD OF THE INVENTION

The present invention relates to an arc welding robot system.

BACKGROUND OF THE INVENTION

An arc welding robot system, which performs arc welding by operating an arc welding robot equipped with a welding torch, is widely used (for example, PTL 1). In such an arc welding robot system, from the standpoint of productivity, reduction in takt time is required in addition to the performance relating to a welding quality. PTL 2 describes a "robot control method in which a welding start instruction is output in precedence earlier than when a welding torch held by a welding work robot reaches a welding start point, by a waste time from when the welding start instruction is output to a welder from a robot controller to when the welder actually starts welding, and a welding end instruction is output in precedence earlier than when the welding torch reaches a welding end point, by a waste time from when the welding end instruction is output to the welder from the robot controller to when the welder actually stops welding ("ABSTRACT").

PATENT LITERATURE

[PTL 1] Japanese Unexamined Patent Publication No. 2012-245558 A
[PTL 2] Japanese Unexamined Patent Publication No. H10-244483 A

SUMMARY OF THE INVENTION

Incidentally, it is considered that the waste time as described in PTL 2 includes the following uncertain elements.
A. Depending on a teaching location of an arc start position, a distance between a weld tip and a weld work varies slightly (the distance also varies, depending on a displacement in weld work installation).
B. The wire burn-back amount at the arc end time at an immediately preceding welding position varies from place to place.
C. Depending on a welding power supply, the wire feed speed from the start of wire feed until the generation of an arc can be designated in regard to each welding position, and thus there is a case where the waste time varies from welding position to welding position, depending to the designation of the speed.

Of the above factors, in particular, it is difficult to predict factors A and B. There is a demand for an arc welding robot system that can optimize a precedence time for issuing a welding start instruction in precedence before the welding torch reaches the welding start point, even in the situation in which prediction of the waste time is difficult.

One mode of the present disclosure is an arc welding robot system including a robot on which a welding torch is mounted; and a robot controller configured to control the robot, the robot controller including a welding instruction unit configured to output an instruction to a welding power supply, based on an arc welding program; a measuring unit configured to measure multiple times, in regard to each of welding positions, a time from when the welding instruction unit sends a welding start instruction to the welding power supply in accordance with a welding start command in the arc welding program, to when a notification signal indicative of generation of an arc is returned from the welding power supply; a storage unit configured to store measurement values measured multiple times by the measuring unit in regard to each of the welding positions; and a precedence time determination unit configured to determine, in regard to each of the welding positions, based on the measurement values stored in the storage unit in regard to each of the welding positions, a precedence time for outputting the welding start instruction in precedence to a timing of the welding torch reaching a welding start point corresponding to the welding start instruction.

According to the above configuration, it is possible to optimize a precedence time for issuing a welding start instruction in precedence to a timing of a welding torch reaching a welding start point corresponding to the welding start instruction.

These objects, features and advantageous effects of the present invention, and other objects, features and advantageous effects, will become clearer from the detailed description of typical embodiments of the present invention, which are illustrated in the accompanying drawings.

DETAILED DESCRIPTION OF EMBODIMENTS OF THE INVENTION

Figure 1:
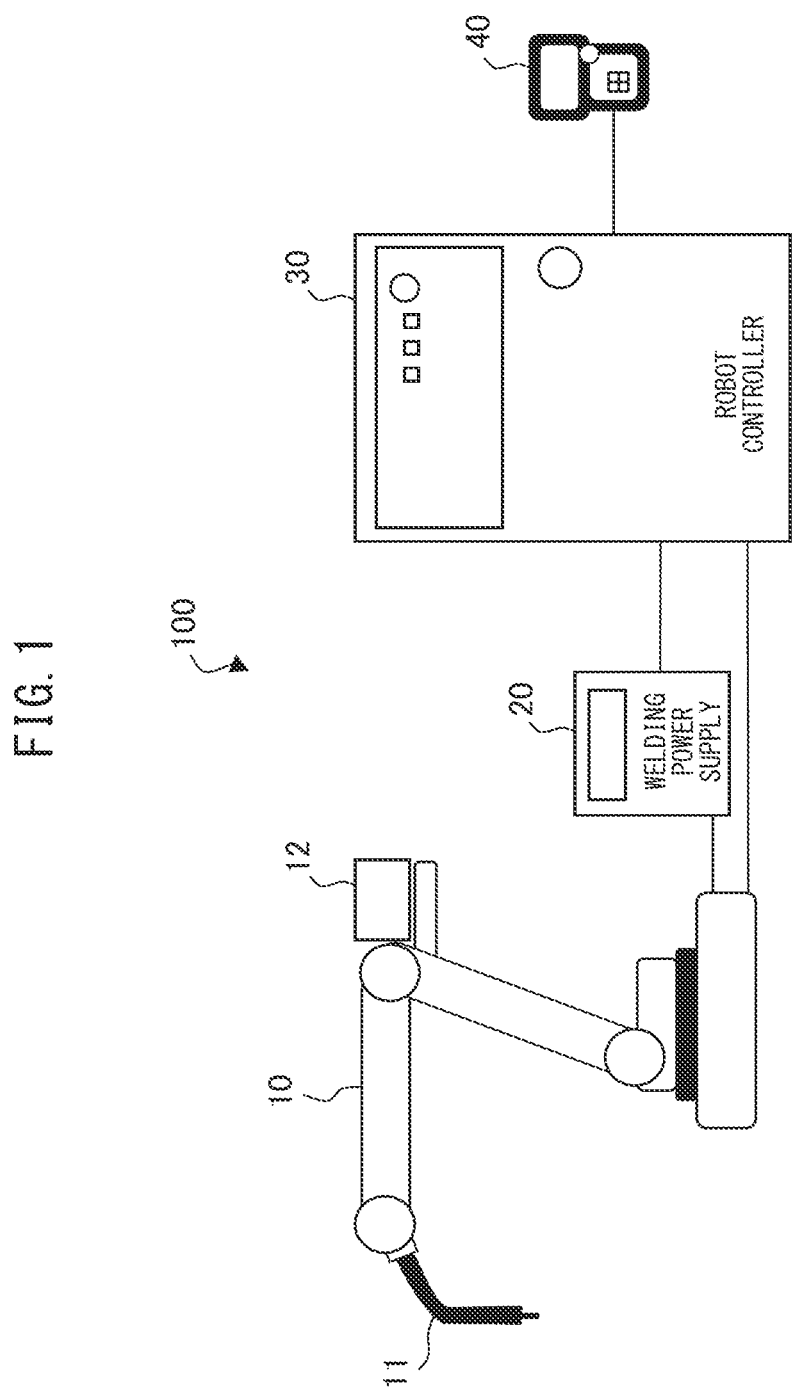
FIG. 1 is a view illustrating an equipment configuration of an arc welding robot system according to one embodiment.

Next, an embodiment of the present disclosure is described with reference to the drawings. In the drawings that are referred to, similar structural parts or functional parts are denoted by like reference signs. For the purpose of easier understanding, the scale in the drawings is changed as appropriate. A mode illustrated in each drawing is an example for implementing the present invention, and the present invention is not limited to the illustrated mode.

FIG. 1 is a view illustrating an equipment configuration of an arc welding robot system 100 according to one embodiment. As illustrated in FIG. 1, the arc welding robot system 100 includes an arc welding robot 10 (hereinafter referred to simply as "robot 10") including an arm distal end on which a welding torch 11 is mounted; a robot controller 30 that controls the operation of the robot 10; and a welding power supply 20. Furthermore, a teach pendant 40 may be connected to the robot controller 30. In this case, an operator operates the teach pendant 40, thereby teaching the robot 10.

The arc welding robot system 100 is a system that performs arc welding on a target by moving the welding torch 11 by using the robot 10. As described below in detail, the robot controller 30 according to the present embodiment includes a function of optimizing a precedence time for issuing a welding start instruction in precedence before the welding torch 11 reaches a welding start point on the target, thereby to reduce the takt time at a time of executing an arc welding program.

The welding power supply 20 is connected to the robot controller 30 via a communication cable, and controls a welding operation in accordance with an instruction from the robot controller 30. The welding power supply 20 includes a function of supplying electric power to the welding torch 11 via a power supply cable; a function of feeding wire to the welding torch 11 from a wire feed source (not illustrated) via a welding wire feeder 12 that is mounted on a front arm of the robot 10; and a function of executing an open/close control of a solenoid valve (not illustrated) that is disposed in a supply path of assist gas from an assist gas supply source (not illustrated) to the welding torch 11. Note that the welding power supply 20 includes a controller that controls the execution of these functions.

The robot 10 is a vertical articulated robot in the present embodiment, but a robot of another type may be used.

Figure 2:
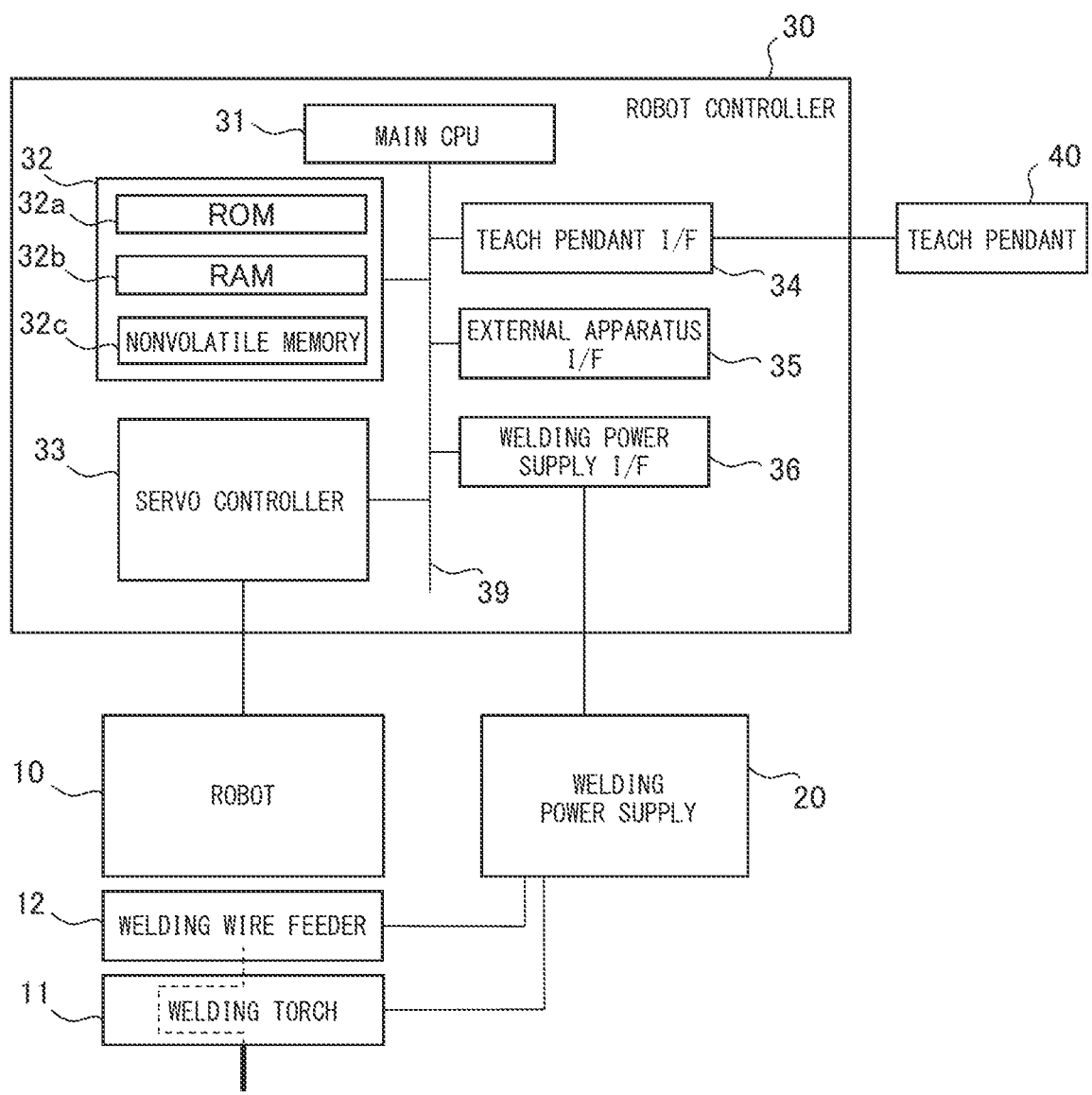
FIG. 2 is a view illustrating a hardware configuration of a robot controller.

FIG. 2 illustrates a hardware configuration of the robot controller 30, and also illustrates a connection relation between the robot controller 30, and the robot 10 and welding power supply 20. As illustrated in FIG. 2, the robot controller 30 is configured such that a memory 32, a servo controller 33, a teach pendant interface 34, an external apparatus interface 35 and a welding power supply interface 36 are connected to a main CPU 31 via a bus 39. The memory 32 includes, for example, a ROM 32*a*, a RAM 32*b* and a nonvolatile memory 32*c*. As the welding power supply interface 36, an ordinary communication interface may be used. In the robot controller 30 with this configuration, the main CPU 31 executes an arc welding program stored in the memory 32, and thereby the operation of the robot 10 is controlled via the servo controller 33, and the control on the welding power supply 20 is executed.

Figure 3:
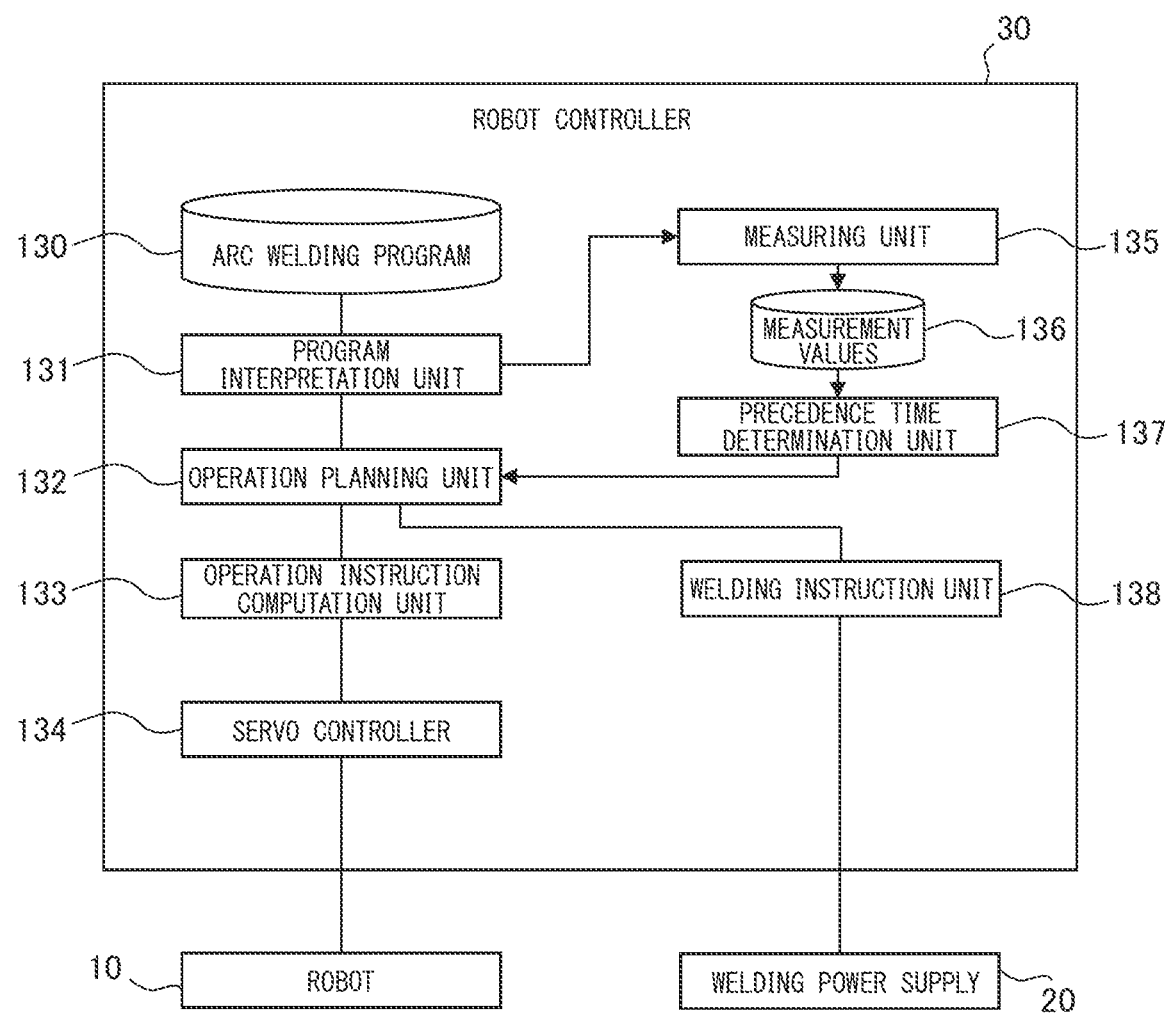
FIG. 3 is a functional block diagram of the robot controller.

FIG. 3 is a functional block diagram illustrating a functional configuration implemented in the robot controller 30. As illustrated in FIG. 3, the robot controller 30 includes a program interpretation unit 131, an operation planning unit 132, an operation instruction computation unit 133, a servo control unit 134, and a welding instruction unit 138. Furthermore, the robot controller 30 includes a measuring unit 135, a measurement value storage unit 136 and a precedence time determination unit 137, as functional elements that determine a precedence time for issuing a welding start instruction in precedence before the welding torch 11 reaches a welding start point on a target. Note that the functional blocks illustrated in FIG. 3 may be implemented by the main CPU 31 of the robot controller 30 executing various kinds of software stored in the memory 32, or may be implemented by a configuration mainly composed of an ASIC (Application Specific Integrated Circuit) or other hardware.

The program interpretation unit 131 reads and interprets an arc welding program 130 in a look-ahead manner, and causes the operation planning unit 132 to generate an operation plan. Based on the result of the look-ahead read and interpretation of the arc welding program 130 by the program interpretation unit 131, the operation planning unit 132 generates an operation sequence of a welding operation by the robot 10. In regard to the operation of the robot 10, the operation planning unit 132 causes the operation instruction computation unit 133 to generate an operation instruction. In addition, the operation planning unit 132 grasps, from the operation sequence, a timing of the robot 10 (welding torch 11) reaching a welding start position or the like, and causes the welding instruction unit 138 to give an instruction to the welding power supply 20.

The operation instruction computation unit 133 computes a control instruction in regard to each joint axis, in accordance with the operation sequence generated by the operation planning unit 132, and provides the control instruction to the servo control unit 134. In accordance with the control instruction, the servo control unit 134 executes servo control of each joint axis (position control of the robot 10).

Figure 6:
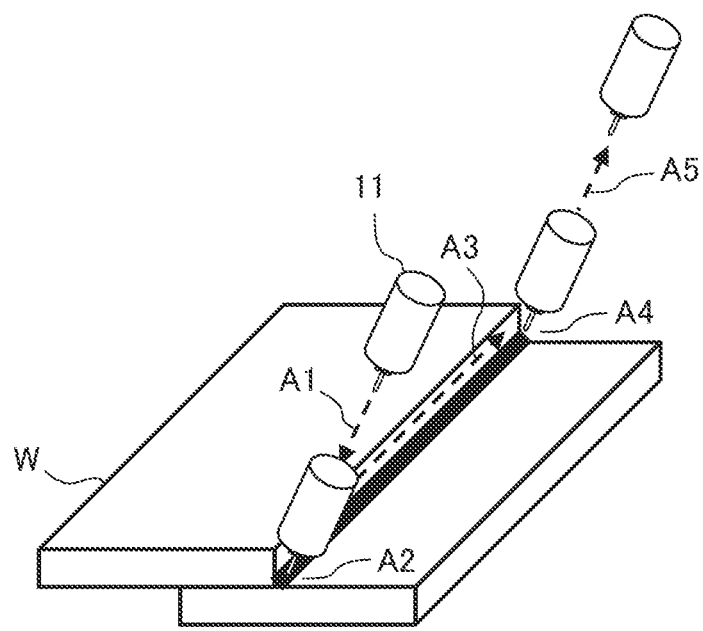
FIG. 6 is a view for describing a welding operation of a robot in a case where the arc welding program is executed.

In describing the function of decreasing the takt time (optimization of the precedence time) by the robot controller 30, for the convenience of understanding, an operation procedure in a case of executing a general arc welding work is described with reference to FIG. 6. Note that FIG. 6 illustrates only a work W of a welding target and a part of the welding torch 11.

1. Move to an arc welding start position (reference sign A1).
2. Issue a welding start instruction to the welding power supply, and stand by until a notification of arc generation comes from the welding power supply (reference sign A2).
3. Move to an arc welding end position while keeping the arc generation (reference sign A3).
4. Turn off the welding start instruction, and issue an instruction for a welding end process to the welding power supply (reference sign A4).
5. Move to a position away from the arc welding end position (reference sign A5).

In the above-described procedure 2, a relatively long waste time occurs. The takt time can be decreased by executing a welding start in precedence by the waste time occurring at this time. However, the waste time includes the above-described uncertain elements A, B and C. The uncertain elements A, B and C are described here once again.

A. Depending on a teaching location of an arc start position, a distance between a weld tip and a weld work slightly varies (the distance also varies depending on a displacement in weld work installation).

B. The wire burn-back amount at the arc end time at an immediately preceding welding position varies from place to place.

C. Depending on a welding power supply, the wire feed speed from the start of wire feed until the generation of an arc can be designated in regard to each welding position, and thus there is a case where the waste time varies from welding position to welding position, depending to the designation of the speed.

Of the above factors, in particular, it is difficult to predict factors A and B, and thus it is difficult to estimate the waste time in advance. In consideration of the circumstances, in the robot controller 30 according to the present embodiment, the measuring unit 135 measures multiple times, in regard to each welding position, a time (waste time) from when the welding instruction unit 138 sends the welding start instruction of a welding start to the welding power supply 20 in accordance with a welding start command in the arc welding program, to when a notification signal indicative of the generation of an arc is returned from the welding power supply 20, and measurement values measured multiple times in regard to each welding position are stored in the measurement value storage unit 136. Then, based on the measurement values stored in regard to each welding position, the precedence time determination unit 137 determines, in regard to each welding position, the precedence time for outputting the welding start instruction in precedence to a timing of the welding torch 11 reaching the welding start point corresponding to the welding start instruction. By acquiring a plurality of measurement values in regard to each welding position, the precedence time can be determined based on a minimum value, an average value, a median and other statistical amounts in regard to each welding position. Note that the measurement value storage unit 136 may be composed of the memory 32 of the robot controller 30, or may be composed of a temporary buffer, a hard disk, or other storage devices of various kinds.

Figure 4:
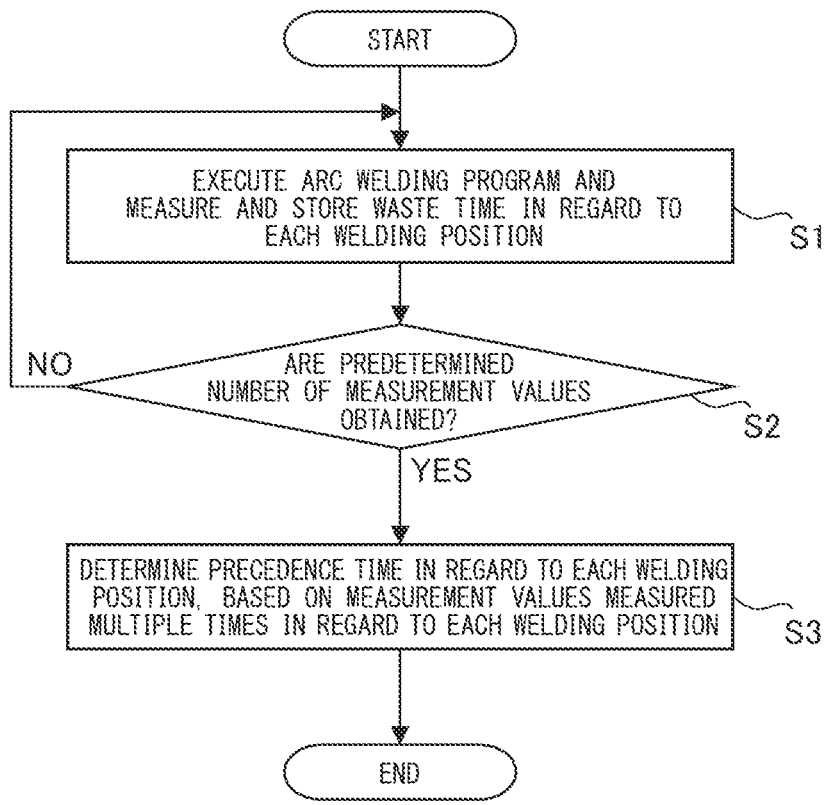
FIG. 4 is a flowchart illustrating a flow of a process for determining a precedence time.

FIG. 4 is a flowchart illustrating a flow of a process (hereinafter referred to also as "precedence time determination process") for determining the above-described precedence time. The precedence time determination process is executed under the control of the main CPU 31 of the robot controller 30. The precedence time determination process is executed, typically, by test-driving the arc welding program at a stage before the actual operation of the arc welding program, but may be executed upon a start instruction from an operator at the stage of actual operation of the arc welding program, or may be executed periodically.

Figure 5:
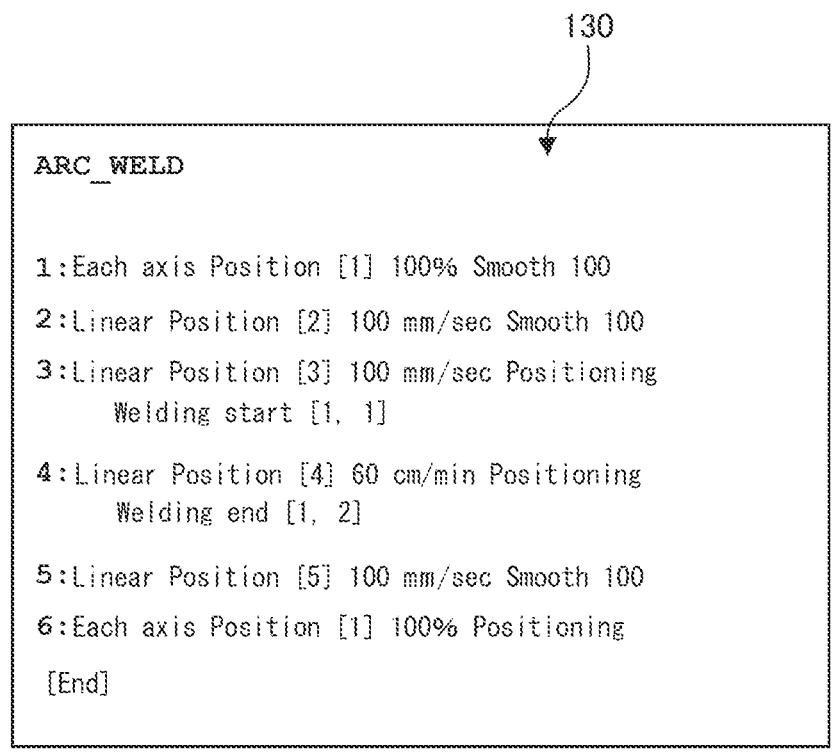
FIG. 5 is a view illustrating an example of an arc welding program.

To start with, by test-driving the arc welding program, the time (waste time) from when the welding instruction unit 138 sends the welding start instruction of the welding start to the welding power supply 20 in accordance with the welding start command in the arc welding program, to when a notification signal indicative of the generation of an arc is returned from the welding power supply 20, is measured and stored in regard to each welding position (step S1). It is assumed that the contents of the arc welding program are as illustrated in FIG. 5. The measurement in this case can be implemented by starting the count by an internal timer in coincidence with the start of the welding start instruction (an instruction of the third line, 'Welding start [1, 1]') in the arc welding program 130 as exemplarily illustrated in FIG. 5, and measuring a time until the notification of an arc discharge start is returned from the welding power supply 20.

The measurement and storage in step S1 are executed until the number of measurement values in regard to each welding position reaches a predetermined number (S2: NO, S1). The predetermined number may be set to be, for example, a number that is enough to calculate an average value. If the predetermined number of measurement values are obtained in regard to each welding position (S2: YES), the process advances to step S3. The process of steps S1 and S2 is executed by the measuring unit 135. In step S3, the precedence time determination unit 137 calculates a precedence time in regard to each welding position, based on the measurement values acquired in regard to each welding position.

The waste time, which is calculated as the time from when the welding instruction unit 138 sends the welding start instruction of the welding start to the welding power supply 20 in accordance with the welding start command in the arc welding program, to when a notification indicative of the generation of an arc is returned from the welding power supply 20, includes:

(T1) a time from when the welding start instruction is sent to the welding power supply 20 to when an arc is actually generated, and (T2) a time from the generation of the arc to when the welding power supply 20 recognizes this and sends the notification signal to the robot controller 30 and the robot controller 30 (measuring unit 135) recognizes this. The former time (T1) is a time that varies due to the above-described variation factors A and B. Hereinafter, the former time (T1) is also described as a variation time. The latter time (T2) is a time that relates mainly to the internal process of the welding power supply 20, and is a fixed time that does not depend on the factor A or B. Hereinafter, the latter time (T2) is also described as a fixed time.

As described above, the precedence time is the time for issuing the welding start instruction to the welding power supply 20 in precedence to a time point when the welding torch 11 reaches a welding start position. In other words, the precedence time is the time for issuing the welding start instruction in precedence to the welding torch 11 reaching the welding start position, thereby ensuring that an arc is actually generated at a time point when the welding torch 11 has reached the welding start position. Accordingly, it is preferable that the precedence time is determined as a time from when the robot controller 30 issues the welding start instruction to when an arc is actually generated. In other words, it is preferable that the precedence time is calculated from the variation time (T1) excluding the fixed time (T2) in regard to the time measured as the waste time. Thus, the precedence time determination unit 137 may determine the precedence time by using a value, which is obtained by subtracting the fixed time (T2) from the measurement value, as a measurement value. The fixed time may be determined from an actual measurement value, an empirical value or a theoretical value relating to an instruction process or a communication process in the welding power supply 20 or the robot controller 30.

Examples of the precedence time calculated by the precedence time determination unit 137 are described below.

Example 1

A least value among a plurality of measurement values is set as a precedence time.

Among measurement values measured in regard to a certain welding position, a least value is determined as the precedence time in regard to the welding position. As the precedence time is longer, the effect of decreasing the takt time becomes greater, but there is a stronger possibility that such a phenomenon occurs that an arc is generated before the robot 10 (welding torch 11) reaches the welding start position. Like the present example, by determining, as the precedence time, the least value of the measurement values that are measured, it becomes possible to decrease the takt time, while exactly avoiding the phenomenon that an arc is generated before the robot 10 (welding torch 11) reaches the welding start position. From this viewpoint, the precedence time of the present example is an example of the optimal precedence time.

Example 2

An average value of a plurality of measurement values is set as a precedence time.

In the case of this example, compared to the case of the above-described Example 1, the effect of decreasing the takt time can be increased, but the precedence time becomes longer, and thus there is a stronger possibility of the occurrence of the phenomenon that an arc is generated before the robot 10 (welding torch 11) reaches the welding start position. Accordingly, in this Example 2, it is possible to strike a balance between the merit of takt time shortening and the demerit of the stronger possibility of the occurrence of an arc before the robot 10 (welding torch 11) reaches the welding start position.

Example 3

A value obtained by decreasing an average value of a plurality of measurement values by a fixed time is set as a precedence time.

In this case, while the effect of takt time shortening can be made greater than in the case of the above Example 1, the possibility of generation of an arc before the robot 10 (welding torch 11) reaches the welding start position can be made less than in the case of the above Example 2.

Example 4

Note that in the case of calculating the average value in the above Examples 2 and 3, noise data (i.e., a value specifically deviating from an average value) may be excluded. As an example of noise data exclusion, "Smirnov-Grubbs test" may be used. The Smirnov-Grubbs test is a test in which when data with an extremely large (small) value is included in data belonging to a group, the data is excluded as "outlier", and the test is used when data is in accord with a normal distribution. Note that the example of the noise data exclusion is not limited to the "Smirnov-Grubbs test".

By the configuration in which the precedence time is determined based on a plurality of measurement values as described above, the precedence time that is difficult to estimate can be optimized.

Note that the precedence time determination unit 137 may be configured to cause a display unit of the teach pendant 40 to display the precedence time of the above Examples 1 to 4, which is calculated based on measurement values that are measured, and configured to accept an operation by a user to select any one of Examples 1 to 4 via an operation unit of the teach pendant 40.

The precedence time determined by the precedence time determination unit 137 as described above is set in the operation planning unit 132. Hereinafter, a description is given of the execution of the arc welding program in a case where the precedence time is set in the operation planning unit 132. A description is given of the operation in the case of executing the arc welding program 130 illustrated in FIG. 5 when the precedence time is set in the operation planning unit 132. FIG. 6 is referred to, in regard to the operation of the robot 10 (welding torch 11) in this case. Note that the precedence time determined by the precedence time determination unit 137 may be stored in the arc welding program 130. In this case, by extracting the precedence time from the arc welding program 130, the operation planning unit 132 can reflect the precedence time in the operation of issuing the welding start instruction in precedence to the welding torch 11 reaching the welding start point.

If the arc welding program 130 is started, the arc welding program 130 is read and interpreted in a look-ahead manner by the program interpretation unit 131, and an operation plan is generated by the operation planning unit 132. At this time, the operation planning unit 132 generates, as an operation plan, an operation sequence including an operation locus, a timing and the like of the robot 10 (welding torch 11).

A command 'Each axis Position [1] 100% Smooth 100' in the first line of the arc welding program 130 is a command to move the robot 10 (welding torch 11) to an initial position set at position [1] (position [ ] indicates a variable to which a position is set) by an each-axis operation. The second line of the arc welding program 130, 'Linear Position [2] 100 mm/sec Smooth 100', is a command to move the robot 10 (welding torch 11) to an approach position set at position [2]. Next, by a command of the third line, 'Linear Position [3] 100 mm/sec Positioning', the robot 10 (welding torch 11) moves to a welding start position (a position of reference sign A2 in FIG. 6) set at position [3].

Based on the operation plan, the operation planning unit 132 predicts a timing when the robot (welding torch 11) reaches the welding start position (the position of reference sign A2 in FIG. 6). The operation planning unit 132 causes the welding instruction unit 138 to execute a command 'Welding start [1, 1]' that is added to the operation command of the third line, at a timing preceding by the precedence time. Thereby, since the welding start is instructed to the welding power supply at a timing preceding by the precedence time in precedence to the robot 10 (welding torch 11) reaching the welding start position, an arc is generated substantially at the same time as the robot 10 (welding torch 11) reaches the welding start position. Thus, if the robot 10 (welding torch 11) reaches the welding start position, the operation planning unit 132 executes the next command 'Linear Position [4] 60 cm/min Positioning', without waiting for the return of a notification of arc generation from the welding power supply 20. Thereby, the welding torch 11 moves to the position designated by the position [4], while performing welding (an operation of reference sign A3 in FIG. 6). Next, at the welding end position (a position of reference sign A4 in FIG. 6), a command 'Welding end [1, 2]' to instruct the stop of welding is executed. Thereby, the welding torch 11 stops arc discharge.

Next, a command 'Linear Position [5] 100 mm/sec Smooth 100' is executed, and thereby the robot 10 (welding torch 11) moves to a retraction position designated at the position [5] (an operation of reference sign A5). Subsequently, 'Each axis Position [1] 100% Positioning' is executed, and thereby the robot 10 (welding torch 11) returns to the initial position designated at the position [1].

By the above-described operation, it is possible to decrease or eliminate a wait time from when the robot controller 30 instructs the welding start to the welding power supply 20 to when the notification of the welding start is returned, and to shorten the execution time (takt time) of the arc welding program.

As described above, according to the present embodiment, it is possible to optimize the precedence time for issuing a welding start instruction in precedence to a timing of the welding torch 11 reaching a welding start point.

Although the present invention has been described by referring to the typical embodiments, it can be understood that a person skilled in the art can make changes, other various modifications, omissions, and additions to the above embodiments, without departing from the scope of the present invention.

The functional block diagram of the robot controller 30, which is illustrated in FIG. 3, is an illustration by way of example, and the arrangement of the functional blocks is not limited to this example. For example, in a possible configuration example, some of the functions illustrated in FIG. 3 may be disposed on the teach pendant 40 side. In this case, the teach pendant 40 and the robot controller 30, as a whole, function as the controller of the arc welding robot.

The program for executing various processes, such as the precedence time determination process in the above-described embodiments, can be stored in various computer-readable storage media (for example, semiconductor memories such as a ROM, an EEPROM and a flash memory, magnetic recording media, and optical discs such as a CD-ROM and a DVD-ROM).

REFERENCE SIGNS LIST

10 Robot
11 Welding torch
12 Welding wire feeder
20 Welding power supply
30 Robot controller
31 Main CPU
32 Memory
32a ROM
32b RAM
32c Nonvolatile memory
33 Servo controller
34 Teach pendent interface
35 External apparatus interface
36 Welding power supply interface
40 Teach pendant
100 Arc welding robot system
130 Arc welding program
131 Program interpretation unit
132 Operation planning unit
133 Operation instruction computation unit
134 Servo control unit
135 Measuring unit
136 Measurement value storage unit
137 Precedence time determination unit
138 Welding instruction unit

The invention claimed is:

1. An arc welding robot system comprising:
a robot on which a welding torch is mounted; and
a robot controller configured to control the robot, the robot controller comprising:
a welding instruction unit configured to output an instruction to a welding power supply, based on an arc welding program;
a measuring unit configured to measure multiple times, in regard to each of welding positions, a time from when the welding instruction unit sends a welding start instruction to the welding power supply in accordance with a welding start command in the arc welding program, to when a notification signal indicative of generation of an arc is returned from the welding power supply;
a storage unit configured to store measurement values measured multiple times by the measuring unit in regard to each of the welding positions; and
a precedence time determination unit configured to determine, in regard to each of the welding positions, based on the measurement values stored in the storage unit in regard to each of the welding positions, a precedence time for outputting the welding start instruction in precedence to a timing of the welding torch reaching a welding start point corresponding to the welding start instruction,
wherein the precedence time determination unit determines, as the precedence time in regard to each of the welding positions, a least value among the measurement values stored in regard to each of the welding positions.

2. The arc welding robot system according to claim 1, wherein the precedence time determination unit subtracts, from the measurement value, a predetermined fixed time corresponding to a time from the generation of the arc to when the welding power supply recognizes the generation of the arc and sends the notification signal and the robot controller recognizes the notification signal, and the precedence time determination unit uses a resultant value as the measurement value for determining the precedence time.

* * * * *